3,123,592
PROCESS FOR POLYMERIZING ISOBUTYLENE
TO POLYISOBUTYLENE
Francesco Gasparoni and Carlo Longiave, Novara, Italy, assignors to Montecatini, Societa Generale per l'Industria Mineraria e Chimica, Milan, Italy, a corporation of Italy
No Drawing. Filed June 22, 1961, Ser. No. 118,785
Claims priority, application Italy June 24, 1960
3 Claims. (Cl. 260—94.8)

Our invention relates to a new process for polymerizing isobutylene to polyisobutylene. More particularly, our invention relates to a new method for polymerizing isobutylene in the presence of diethylaluminum monochloride.

The most commonly used catalysts for the polymerization of the isobutylene are the boron trifluoride and the aluminum trichloride. However, when molecular weights in the range of 100,000 are desired, by operating in the presence of $AlCl_3$, it is necessary to carry out the polymerization at very low temperatures, more particularly at temperature below —50° C. It is also known that ethylaluminumdichloride will promote the polymerization of isobutylene while diethylaluminum monochloride had been proved to be inactive to this purpose (Ziegler, Brennst. Chem. 33, 193 (1952)).

An object of our invention is to polymerize isobutylene by diethylaluminum monochloride catalyst, contra to the above.

A further object is to produce a very high molecular weight polyisobutylene by the aid of said catalyst. This can be accomplished by carrying out the polymerization at much higher temperatures than those required to obtain the same result in the presence of the catalyst described as suitable for this purpose in the known art.

The invention has as a still further object the use of solvents having a dipole moment higher than 1, whereby isobutylene not only polymerizes at a rate which increases as the dipole moment of said solvent increases, but also that the molecular weight increases correspondingly, so that it exceeds the value of a million at temperature below —50° C.

The solvent used has to be liquid at the polymerization temperature that is between 0° and —100° C. and must not react with the dialkylaluminum monohalides.

When a solvent having a null (zero) dipole moment or abut null (zero), as heptane, octane, toluene, xylene, etc., is used, the diethylaluminummonochloride catalyst no longer promotes the polymerization of the isobutylene. In order to illustrate, but not to limit the invention, a list of solvents having a dipole moment higher than 1 is cited hereinafter and which may be used according to the process of the present invention: ethylbromide, ethyliodide, ethylchloride, chlorobenzene, bromobenzene, iodobenzene, etc. Of these, ethylchloride (dipole moment 1.8) and chlorobenzene (dipole moment 1.55) have been proved to be particularly active. The amount of catalyst necessary for the catalysis, varies inversely with the dipole moment of the solvent; the smaller quantity is necessary the higher dipole moment of the solvent. For instance, in the presence of $C_2H_5Cl$, up to 2 g./l. of $(C_2H_5)_2AlCl$ can be used, while in the presence of chlorobenzene up to 4 g./l. of $(C_2H_5)_2AlCl$, may be used, but it is preferable to employ 7 g./l. in the former case and 11 g./l. in the second case.

Additional amounts of catalyst, for instance 35 g./l., have only very little influence on the molecular weight. While the molecular weight decreases by increasing the polymerization temperature in the presence of known catalysts, when the polymerization is carried out according to the present invention, the values obtained at a specified temperature are much higher; for instance, in the presence of $BF_3$, it is necessary to work at —50° C. in order to have a molecular weight of 200,000 whilst in the presence of $AlCl_3$, a temperature of about —100° C. is necessary; in the presence of diethylaluminum monochloride and ethylchloride, the polymerization may be carried out at —25° C. in order to obtain the same results. At temperatures above 0° C., oily products having a low molecular weight are obtained.

The polymerization may be carried out either batchwise or continuously using either a pure or a diluted monomer; furthermore, the monomer which has been precooled at the polymerization temperature, may be introduced in the solvent containing the catalyst in order to better control the temperature. When an aliphatic halide is used as the solvent, a polymer is obtained which is nearly insoluble in the solvent and which has tendency to separate from the liquid; when using aromatic halides, however, a polymer is obtained which is soluble in the reaction medium.

The following examples are given to illustrates the present invention without limiting the scope thereof.

EXAMPLE 1

100 g. ethylchloride are introduced in a 500 ml. flask and cooled at —50° C.; 10 millimoles diethylaluminum monochloride are then added; afterwards 65 g. liquid isobutylene, cooled at —50° C., are slowly introduced under stirring, over a 25 minute period, from a separatory funnel. After one hour, a white mass consisting of solid polymer is obtained, which is partially soluble in the solvent. The polymer is precipitated with 500 g. methanol, washed with methanol and dried under vacuum at a temperature of +50° C. 46 g. polyisobutylene, having an intrinsic viscosity of 1.92, corresponding to a molecular weight of 1,070,000 are so obtained. The molecular weight has been calculated from the viscosity measured in toluene at 25° C., by the formula $$(\eta) = 2.6 \times 10^{-4} \times M^{0.64}$$

according to Scott, Carter and Magat.

EXAMPLE 2

100 g. ethylchloride are introduced in a 500 ml. flask and are then cooled to —50° C.; 8 millimoles diethylaluminummonochloride are added. 50 g. isobutylene cooled at —50° C. are then slowly introduced, over a 20 minute period, from a separatory funnel under stirring. After one hour, a semisolid mass is obtained, which is poured in methanol; the polymer thus precipitated is washed and dried under vacuum at a temperature of +50° C. 41 g. polyisobutylene, having an intrinsic viscosity of 1.77 measured in toluene at 25° C., corresponding to a molecular weight of 960,000, are obtained.

EXAMPLE 3

By operating according to the method described in Example 1 and under the conditions of the Table I, several tests have been carried out in order to demonstrate the influence of the temperature. The obtained results are reported hereinbelow:

Table I

| Run No. | $(C_2H_5)_2AlCl$ | Solvent | T., °C. | Duration, hs. | Yield, percent | Viscosity[1] | M.W. |
|---|---|---|---|---|---|---|---|
| 1 | 10 | $C_2H_5Cl$ | −70 | 1 | 41 | 2.42 | 1,600,000 |
| 2 | 10 | $C_2H_5Cl$ | −50 | 1 | 72 | 1.92 | 1,070,000 |
| 3 | 10 | $C_2H_5Cl$ | −30 | 1 | 100 | 1.06 | 425,000 |
| 4 | 10 | $C_2H_5Cl$ | −10 | 1 | 100 | 0.26 | 58,000 |
| 5 | 10 | chlorobenzene | −45 | 1 | 27 | 1.43 | 680,000 |
| 6 | 10 | ___do___ | −30 | 1 | 26 | 1.07 | 430,000 |
| 7 | 10 | ___do___ | −10 | 1 | 31 | 0.61 | 168,000 |

[1] Determined in toluene at 25° C.

EXAMPLE 4

For comparision, a test was carried out by using $AlCl_3$. The polymerization is carried out with 10 mM. $AlCl_3$ in chlorobenzene at −45° C. After one hour, a polymer is obtained having a molecular weight of 70,000 with a yield of 38%.

The corresponding test carried out in the presence of $(C_2H_5)_2AlCl$ (run No. 5 of the Example 3) yielded a polymer having a molecular of weight 680,000.

Another test in toluene at −50° C. with 10 mM. $AlCl_3$ has given, after one hour, a polymer having a molecular weight of 61,000 with a yield of 57%.

We claim:

1. The process of polymerizing isobutylene in the liquid phase which comprises using a catalyst consisting of diethylaluminum monochloride and using, as a reaction medium, a solvent selected from the group consisting of ethylchloride, ethyliodide, ethylbromide, chlorobenzene, bromobenzene and iodobenzene, said solvent being a liquid under polymerization conditions and being inert to said diethylaluminum monochloride catalyst.

2. The process of polymerizing isobutylene in the liquid phase which comprises using a catalyst consisting essentially of diethylaluminum monochloride and using ethylchloride, as the reaction medium, said reaction medium having a dipole moment of at least one, said solvent being a liquid under polymerization conditions and being inert to said diethylaluminum monochloride catalyst.

3. The process of polymerizing isobutylene in the liquid phase which comprises using a catalyst consisting essentially of diethylaluminum monochloride and using chlorobenzene, as the reaction medium, said reaction medium having a dipole moment of at least one, said solvent being a liquid under polymerization conditions and being inert to said diethylaluminum monochloride catalyst.

References Cited in the file of this patent

UNITED STATES PATENTS

| 2,734,047 | Smth et al. | Feb. 7, 1956 |
| 2,898,329 | Kittleson | Aug. 4, 1959 |
| 2,993,035 | Christman | July 18, 1961 |

OTHER REFERENCES

Brennstoff-Chemie (Ziegler), BD 33, pages 193–200, January 1952, published by Verlag W. Girardet, Essen.